(12) United States Patent
van der Staay et al.

(10) Patent No.: US 6,382,175 B1
(45) Date of Patent: May 7, 2002

(54) METHOD FOR MONITORING THE OPERATION OF A PISTON-TYPE INTERNAL-COMBUSTION ENGINE WITH FULLY VARIABLE CYLINDER VALVES

(75) Inventors: Frank van der Staay; Lutz Kather, both of Würselen (DE)

(73) Assignee: FEV Motortechnik GmbH, Aachen (DE)

( * ) Notice: Subject to any disclaimer, the term of this patent is extended or adjusted under 35 U.S.C. 154(b) by 0 days.

(21) Appl. No.: 09/596,558

(22) Filed: Jun. 19, 2000

(30) Foreign Application Priority Data

Jun. 17, 1999 (DE) .......................................... 199 27 669

(51) Int. Cl.$^7$ ................................................ F02B 77/00
(52) U.S. Cl. ................................ 123/198 D; 123/90.11; 123/198 F
(58) Field of Search .................... 123/90.11, 198 D, 123/198 F

(56) References Cited

U.S. PATENT DOCUMENTS

| 5,671,705 A | * | 9/1997 | Matsumoto | ............... 123/90.11 |
| 5,765,514 A | * | 6/1998 | Sono et al. | ............... 123/90.11 |
| 5,782,211 A | * | 7/1998 | Kaminmaru | ............. 123/90.11 |
| 5,934,231 A | * | 8/1999 | Schmitz et al. | .......... 123/90.11 |

* cited by examiner

*Primary Examiner*—Noah P. Kamen
(74) *Attorney, Agent, or Firm*—Venable; Norman N. Kunitz

(57) ABSTRACT

A method for monitoring the operation of a piston-type internal combustion engine, comprising electromagnetic actuators with filly variable actuation for the cylinder valves, wherein the engine control unit supplies current based on respective predetermined current flows. The actuators are associated with respective sensors for detecting operation and transmitting operationally relevant signals to the engine control unit of the displacement movement of the respective actuator. The engine control unit detects the current and voltage flows for the actuator and, if no sensor signal is received, a sensor failure or actuator failure is detected from the voltage flow at the actuator. If a sensor fails at the actuator, the detection of a sensor signal is taken from a different, corresponding actuator by the engine control unit and the engine control unit causes initiation of a starting operation (start of oscillations) for the actuator initially determined to be non-operative. If an actuator failure subsequently is detected, the associated cylinder is shut down.

8 Claims, 6 Drawing Sheets

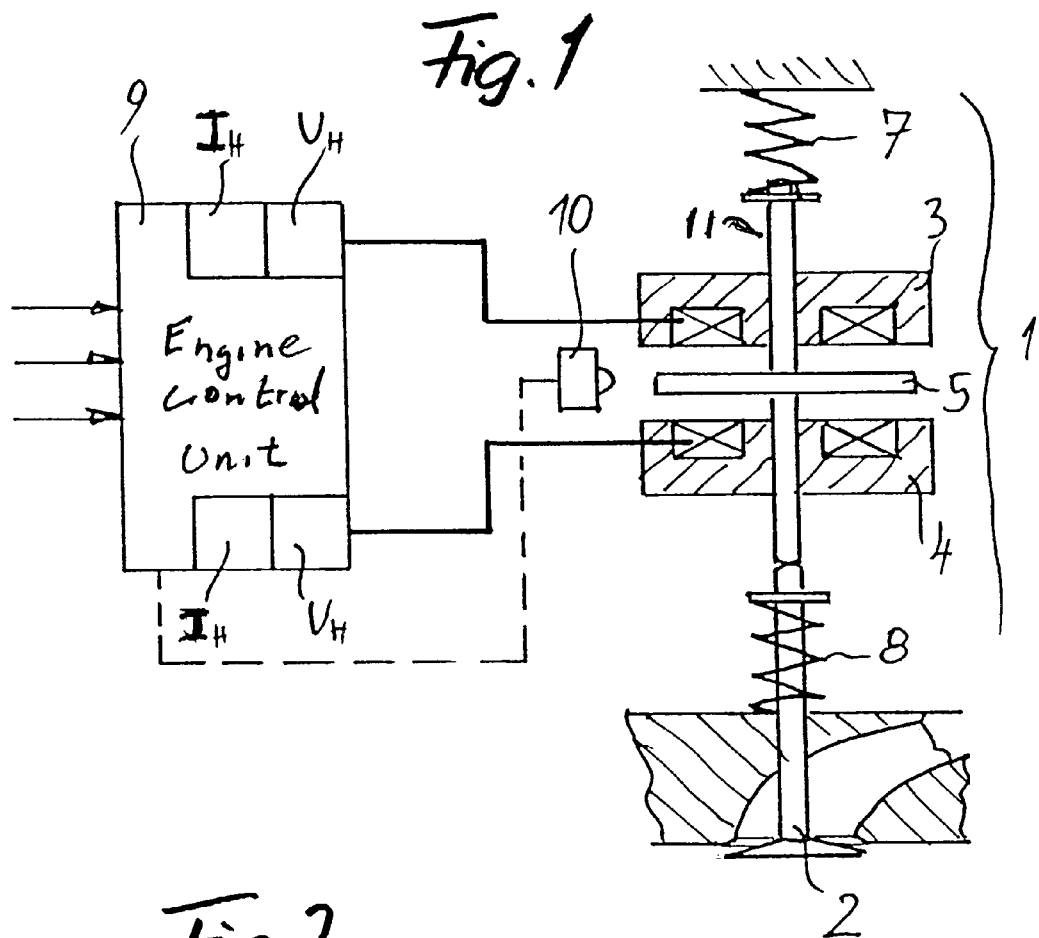
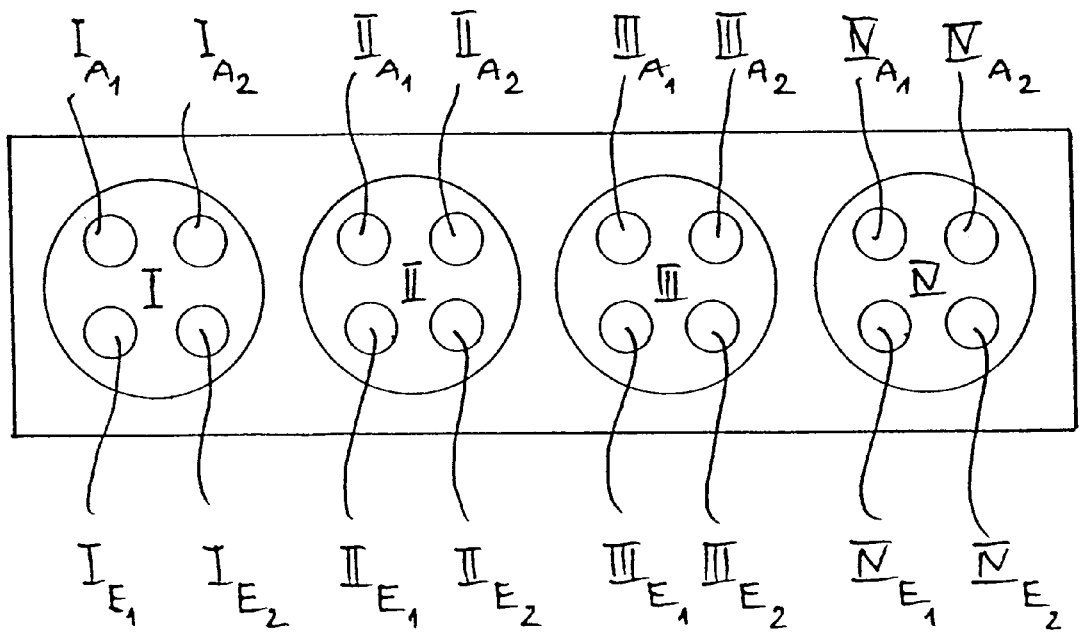

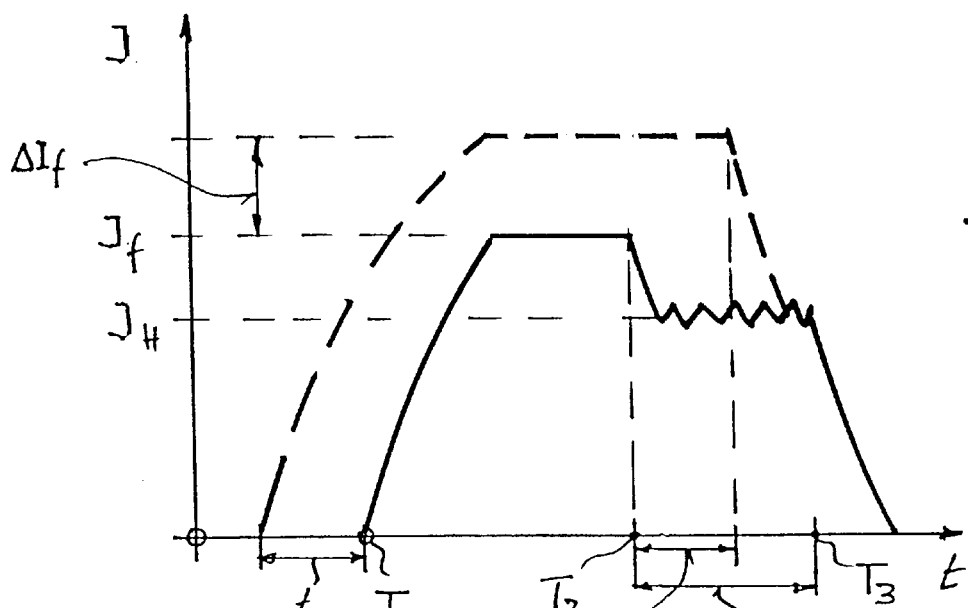
Fig. 3
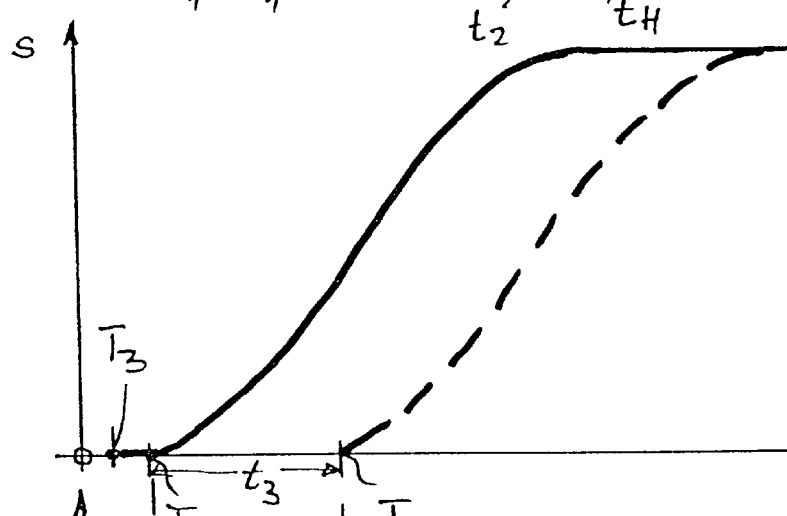
Fig. 4
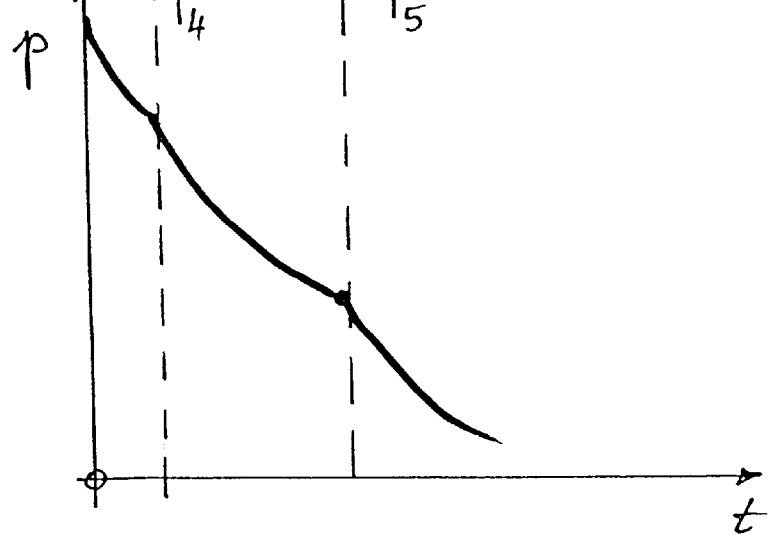

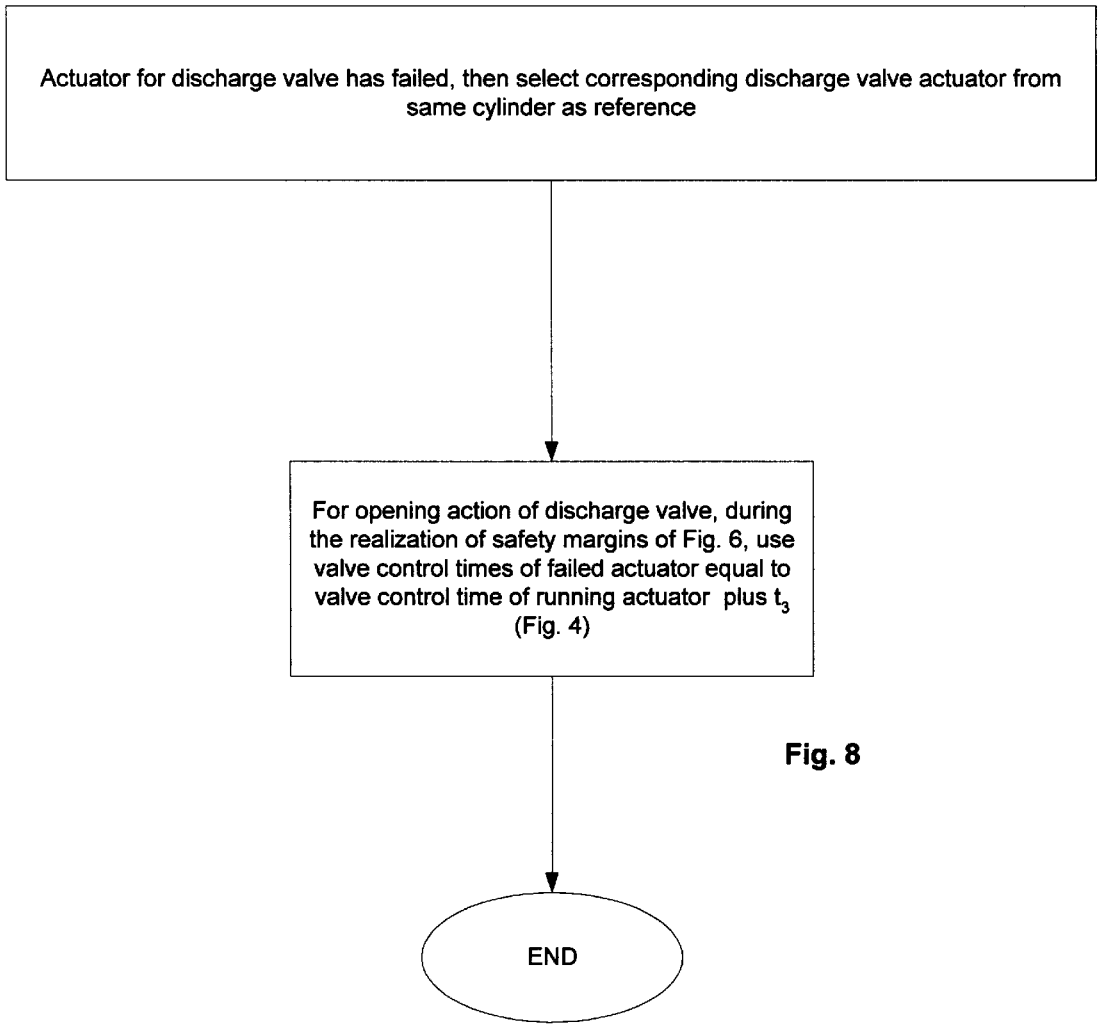

METHOD FOR MONITORING THE OPERATION OF A PISTON-TYPE INTERNAL-COMBUSTION ENGINE WITH FULLY VARIABLE CYLINDER VALVES

CROSS REFERENCE TO RELATED APPLICATION

This application claims the priority of German patent Application No. 199 27 669.2 filed Jun. 17, 1999, which is incorporated herein by reference:

BACKGROUND OF THE INVENTION

The valve drives of piston-type internal combustion engines with fully variable actuation of the cylinder valves are electromagnetic actuators that each essentially comprises two electromagnets that are axially spaced from each other. An armature that is connected to the respective cylinder valve moves back and forth between the two electromagnets. The current supply to the electromagnets is controlled by an engine control unit. For the actuator operation, it is furthermore important that the impact speed of the armature on the pole surface of the associated electromagnet is minimized once the respective switching position is reached, in that a safe operation with simultaneous minimizing of the electrical power consumption is critical. The actuators therefore cannot be operated without integrated sensors in order to meet the operational requirements of the piston-type internal combustion engine. However, the existence of such sensors leads to possible malfunctions that must be monitored. Important in this connection is the failure of a sensor while the associated actuator is still operational. Until now, the failure of a sensor on an actuator resulted in the respective actuator being identified as "non operative" by the engine control unit. Accordingly, the associated cylinder is completely shut down by turning off the fuel supply and preventing the firing of the cylinder. Depending on the case, the actuators for all cylinder valves of this cylinder may also be shut down. If necessary, the load share of the malfunctioning, shutdown cylinder is then distributed, via corresponding control programs in the engine control unit, to the other fired cylinders.

SUMMARY OF THE INVENTION

In accordance with the invention, the above discussed problems are corrected by a method for monitoring the operation of a piston-type internal combustion engine with fully variable actuation of the electromagnetic actuator for the cylinder valves, which can be actuated by an engine control unit that controls a current supply based on respective predetermined current flows. The cylinder valves are each associated with a respective sensor for detecting the actuator operation, which sensor transmits relevant signals for the movement curve of the respective actuator to the engine control unit, wherein the current flow and voltage course or curve for the actuator are detected. The lack of a sensor signal, indicating a sensor failure or a failure of the actuator, is detected by use of the voltage curve at the actuator. If a sensor of an actuator fails, the detection of a sensor signal is taken up by the engine control unit from the sensor of another corresponding actuator. The engine control unit then switches to the starting operation for the actuator initially identified as non operative (start of oscillations), and does not shut down the associated cylinder until a failure of this actuator is detected.

With a failed sensor but still operative actuator, this measure allows continued operation of the piston-type internal combustion engine with a normal operational sequence for all cylinders and the replacement of the failed or missing sensor signal with a signal from an operative sensor on another, corresponding actuator. However, if the detection of current and voltage during the movement sequences should show that no armature movement is occurring, then damage to the actuator must be assumed and the cylinder must be shut down accordingly. This means that the fuel supply is shut down, the cylinder is not fired and continues to operate "empty," depending on the layout of the program and the number of cylinder valves that are provided. The remaining cylinder valves are actuated in the normal operating cycle. It may be advisable in that case if at least the fuel supply to the respective cylinder already is shut down during the test phase, meaning during the transition to the starting operation, and is started again only after the signal "actuator operational" has been received. As a result, the travel of non-burnt fuel during this intermediate phase into the exhaust-gas system, where it loads the exhaust gas post-processing equipment with non-burnt hydrocarbons, is avoided.

A modified version of the method according to the invention provides that for start-up and/or normal operation, the actual current flow for the actuator that corresponds to the actuator with a defective sensor is stored in the engine control unit and is expanded or changed by increased factors of safety for the progression over time and/or the current level, and the actuator with a defective sensor is actuated based on the expanded or changed current flow. In case of a sensor failure but an otherwise functional actuator, it is thus possible to take into account external influences that may be present, for example, a stray band caused by the combustion stochastic, straying in the actuator characteristic or even possible actuator wear. The expansion of the current flow in particular can result in an increase in the level of the capturing current and/or in moving forward the time for activating the capturing current, so as to ensure a successful start-up via such an increased factor of safety.

A modification of the invention provides for the engine control unit to detect, as a corresponding actuator, the operation of an actuator operated according to the control program under the same operating conditions as the actuator to be started. For an actuator with a sensor defect on a gas intake valve, this means that the actuator of another gas intake valve is considered as a corresponding actuator. The same is true for the gas discharge valves. For a piston-type internal combustion engine whose the respective cylinders have at least two gas intake valves and/or at least two gas discharge valves, it is advantageous if the actual current flow to be stored is detected from the corresponding actuator on the same cylinder. With piston-type internal combustion engines having, for example, two intake valves but only one discharge valve or with piston-type internal combustion engines having only one intake valve and one discharge valve for each cylinder, the current flow to be stored for the actuator with a sensor defect on this one valve is tapped or picked up from a corresponding actuator on another cylinder.

The realization of the method according to the invention furthermore provides that in order to take into account the engine dynamics, the actual current flow selected is that of a corresponding actuator on a cylinder that is positioned in the firing sequence directly in front of the cylinder having the actuator with the sensor defect. As a result, the actuation of the actuator with a failed sensor can be taken over by the sensor of the corresponding actuator without noticeable effect on the engine operation.

In addition, the realization of the method according to the invention provides that as an increased factor of safety for the current flow to be expanded, only a displacement of the opening time in the direction of a "late discharge opening" is made on an actuator with a sensor defect in order to actuate the discharge valve. For this, the actuator is operated on the basis of the normal current flow, predetermined by the control unit, with respect to the capturing current level and also the capturing current start-up time. The actuator is actuated only with a somewhat later control time for the discharge opening because the pressure level in the associated cylinder has already dropped and the operation is therefore safer.

The invention is explained in further detail below with the aid of schematic drawings.

BRIEF DESCRIPTION OF THE DRAWINGS

FIG. 1 is a diagram for an electromagnetic actuator for actuating a cylinder valve, which actuator can be actuated by an engine control unit.

FIG. 2 is a schematic showing of a 4-cylinder piston-type internal combustion engine with four cylinder valves per cylinder.

FIG. 3 shows the current flow in an electromagnet of an actuator.

FIG. 4 shows the displacement during the gas discharge valve opening in dependence on the time and corresponding to the pressure reduction in the cylinder.

FIG. 8 is an additional partial flow chart for the region A in FIG. 5, for another modification of the method;

DETAILED DESCRIPTION OF THE PREFERRED EMBODIMENTS

Figure 5:
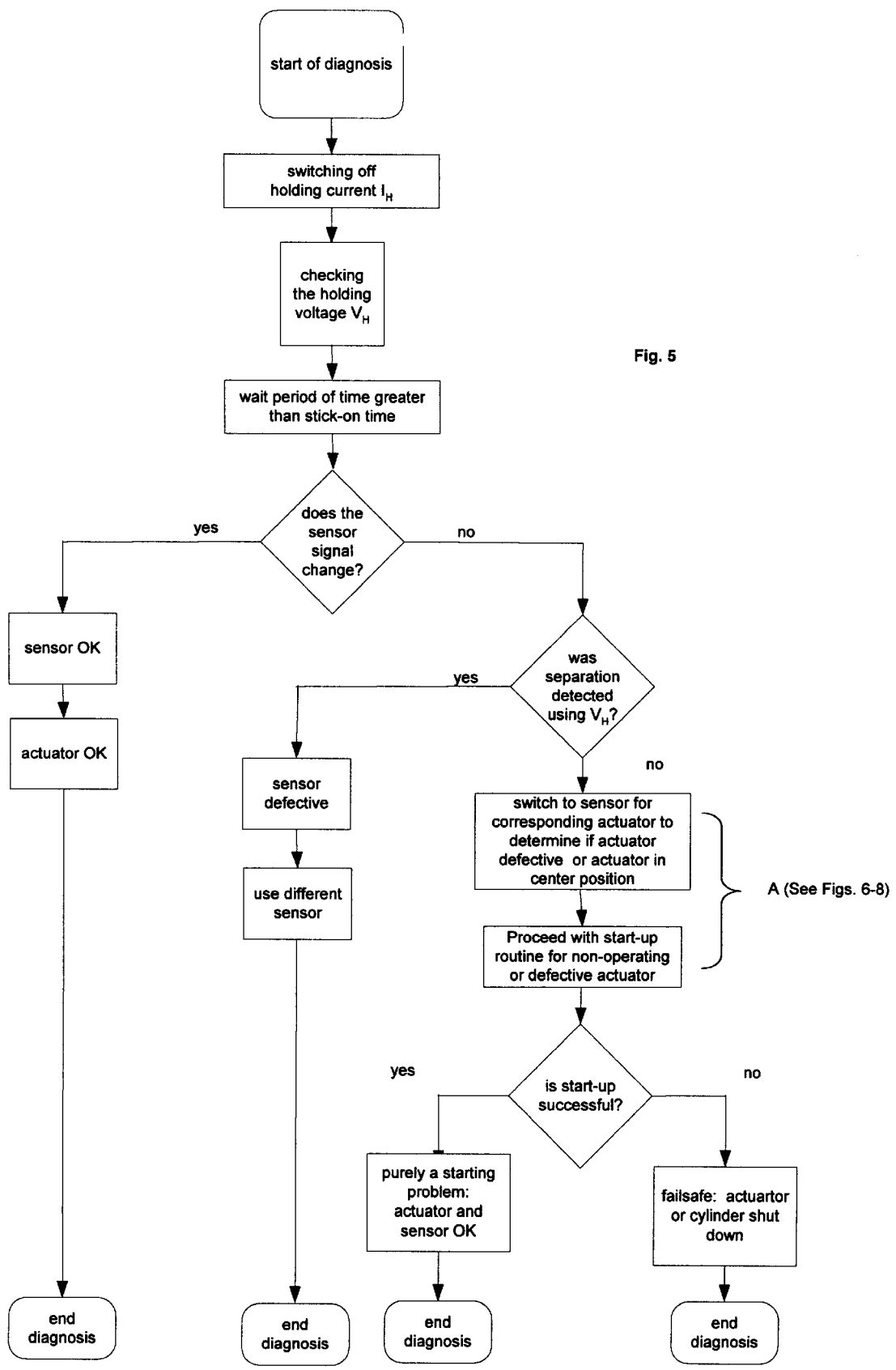
FIG. 5 is a flow chart for the monitoring method according to the invention in the engine control unit for a sensor/actuator failure.

FIG. 1 schematically shows an electromagnetic actuator 1 for actuating a cylinder valve 2. The actuator 1 essentially consists of a closing magnet 3 and an opening magnet 4 that are arranged at a distance or spaced from each other along a longitudinal axis of the actuator, and between which an armature 5 is mounted to be moved back and forth counter to the force of resetting springs, namely an opening spring 7 and a closing spring 8. The electromagnets 3 and 4 of the actuator 1 are actuated via an electronic engine control unit 9 based on predetermined control programs and in dependence on operating data supplied to the engine control unit, such as speed, temperature, etc.

A sensor 10 for detecting the actuator operation is assigned to the actuator 1. The sensor 10 is shown schematically herein. Depending on the layout of sensor 10, the displacement of armature 5 can be detected, for example, so that information corresponding to the respective momentary armature position can be transmitted to the engine control unit 9. The armature speed can then be determined in the engine control unit 9 with corresponding computing operations, so that the current supplied to the two electromagnets 3, 4 can be controlled in dependence on the armature position as well as in dependence on the armature speed.

It is not required for the sensor 10 to be arranged on the side of the armature, as shown. Rather, it is also possible to arrange corresponding sensors in the region of the pole surface of the respective electromagnet 3 or 4, or to assign them to a guide rod 11 that is connected to the armature 5.

The engine control unit 9 furthermore comprises corresponding means for detecting the current I and the voltage V for the respective electromagnets 3 and 4, as well as for changing the current flow and the voltage course or curve. The actuator 1 of cylinder valve 2 can be fully variably actuated by the engine control unit 9 and in dependence on predetermined operating programs. If necessary the actuation can be based on corresponding performance characteristics, for example, the start and end of the valve opening times, the height of the opening stroke or even the number of opening strokes during an opening period or the like.

FIG. 2 schematically shows a 4-cylinder piston-type internal combustion engine, wherein each cylinder I, II, III, IV is provided, respectively, with two intake valves $I_{E1}$ and $I_{E2}$, $II_{E1}$ and $II_{E2}$, $III_{E1}$ and $III_{E2}$, or $IV_{E1}$ and $IV_{E2}$ as well as two discharge valves $I_{A1}$ and $I_{A2}$, $II_{A1}$ and $II_{A2}$, $III_{A1}$ and $III_{A2}$, or $IV_{A1}$ and $IV_{A2}$. If, during operation the engine control unit 9 does not receive a signal from, for example, the sensor of the gas-intake valve $I_{E1}$, the course or curve of the holding voltage $V_H$ is checked during the shutdown of the holding current $I_H$ during the next operating cycle. If the armature 5 was resting against the pole surface of the respective electromagnet for which the holding current was shut down, a characteristic drop in the holding voltage results. If this characteristic drop in the holding voltage is detected or determined, the armature 5 made contact and it can be inferred from this that only the sensor 10 is defective. In that case, and based on the method according to the invention, this actuator can continue to be operated regardless of the respective signals from the malfunctioning sensor.

However, as described in further detail in the following, it is also possible within the scope of the engine control unit 9 to switch to the sensor of the corresponding gas intake valve $I_{E2}$ in order to take into account the engine dynamics, so that the current flow of the actuator 1 for the gas intake valve $I_{E1}$ can be controlled via the sensor 10 of gas intake valve $I_{E2}$. If the drop in the holding voltage $V_H$ for actuator $I_{E1}$ that is characteristic for a separation of the armature 5 from the pole surface is not detected, the possibility again presents itself that either the respective actuator is defective or that it has been "snagged" in the center position due to external influences. In that case, the engine control unit 9 switches to the starting operation for the actuator of the gas intake valve $I_{E1}$ That is, the two electromagnets 3, 4 are stimulated, by the engine control unit according to the program intended for start-up, to oscillate the armature 5 by alternately supplying the two electromagnets with current until the armature 5 comes-to rest. The oscillations are started such that by correspondingly actuating the start-up program, the armature 5 comes to rest on the pole surface at a point in time at which this would have to occur during normal operations as well, so that normal operations for this cylinder valve could continue, provided the actuator 1 is operative. If a signal from sensor 10 is detected simultaneously, then only an operational interference occurred, meaning the actuator and also the sensor are operative and normal operations can continue.

The sensor 10 is defective if no sensor signal is detected, but an orderly voltage course and current flow are detected via the voltage course for the respective electromagnet of the actuator under current. In that case, the actuation occurs without regard to a sensor or through takeover of the operating data for the sensor on a corresponding actuator, as described in the above.

However, if no signals are detected at all, the respective actuator is defective and is shut down or, if during the start-up operation the fuel supply was shut down and a firing prevented, the fuel supply remains shut down and no firing occurs. In that case, the engine control unit can distribute the load of the non-working cylinder with equal shares to the remaining cylinders.

FIG. 3 shows the current flow on an electromagnet 3 or 4, which is controlled by the engine control unit 9. At point in time $T_I$, the capturing current is switched on if the armature 5 approaches a capturing electromagnet, for example, when it passes through the center position. The capturing current is held at a predetermined current level $I_f$ during a specifiable period, so that it is ensured that the armature 5 has come to rest against the pole surface of the respective electromagnet 3 or 4. Following this, the current level is lowered at point in time $T_2$ to the holding current $I_H$, wherein the current level is clocked during this holding time $t_H$. The current is then switched off at point in time $T_3$, at the respective predetermined opening moment or closing moment for the cylinder valve. Thus, following the disintegration of the magnetic field, the armature 5 and the cylinder valve 2 together are moved to the other switching position as a result of the force effect of the associated resetting spring 7 or 8. With this separating action, the holding voltage shows a characteristic flow because the residual magnetization of the armature as it separates from the holding electromagnet induces a voltage, which can be detected in the engine control unit 9 by detecting the level and course over time.

According to the invention, if a sensor signal was not received and the engine control unit makes an attempt at start-up, then according to FIG. 3 a predetermined current flow is taken over from a corresponding actuator for the start-up and in particular for the subsequent further operation. For example, the current flow of the corresponding intake valve $I_{E2}$ is taken over as described in the above with the aid of FIG. 2. To ensure an orderly flow for this current, the actuator of the intake valve $I_{E1}$ that must be actuated again is actuated with a current flow for which the start-up time has been moved up by an interval $t_1$, relative to $T_1$, and for which a capturing current level has been increased by $\Delta IF$. As an increased factor of safety, the switching moment for this point in time is later by the interval $t_2$, as compared to the point in time for switching back to the holding current $I_{H'}$. These measures are illustrated in FIG. 3.

Another characteristic feature for the gas discharge valves is the result of the gas counter pressure. The course of the armature displacement s in dependence on time is represented in FIG. 4. If the holding current on an actuator for a gas discharge valve is switched off at point in time $T_3$, as shown in FIG. 3, the armature will separate at point in time $T_4$ from the pole surface following a certain stick-on time, so that the cylinder valve is moved from the "closed" position to the "open" position and the armature 5 has come to rest against the pole surface of electromagnet 4.

If a missing sensor signal was detected in an embodiment of the engine control unit 9 that is used with the method according to the invention, but it was simultaneously detected that the armature 5 was resting against the closing magnet 3 in the closed position, then the actual opening point in time $T_4$ is displaced by the engine control unit 9 by a predetermined interval $T_3$ in the direction of a "later discharge opening," so that a start of movement actually can occur only at point in time $T_5$.

If the discharge valve displacement in dependence on the time is compared to the course of the cylinder pressure, also in dependence on the time, it turns out that at a point in time $T_4$, the actuator still has to overcome a high counter pressure for the opening operation.

However, if the opening moment is displaced by the time $t_3$, then a noticeable pressure reduction has already occurred in the cylinder, so that a considerably lower counter pressure must be overcome during the opening operation.

The above example was explained for the operational case where a malfunction was detected at the intake valve $I_{E1}$ for a piston-type internal combustion engine according to FIG. 2, having two intake valves and two discharge valves per cylinder. The "switching" to the sensors on a corresponding actuator always occurs through switching to an actuator with identical operation, meaning if the actuator of one intake valve fails, a switch is made to the actuator of another intake valve and the same occurs for the discharge valves.

With the embodiment according to FIG. 2, it is always favorable for the engine control unit 9 to utilize the remaining actuator of the same type on the same cylinder as the corresponding actuator.

If an actuator malfunctions on the discharge valve of a piston-type internal combustion engine with only one discharge valve, for example, a switch must occur to the signal of the actuator of a discharge valve for a different cylinder. It is useful in this case if a switching occurs to an actuator that is arranged in the firing sequence immediately before the cylinder with the actuator to be started.

Figure 6:
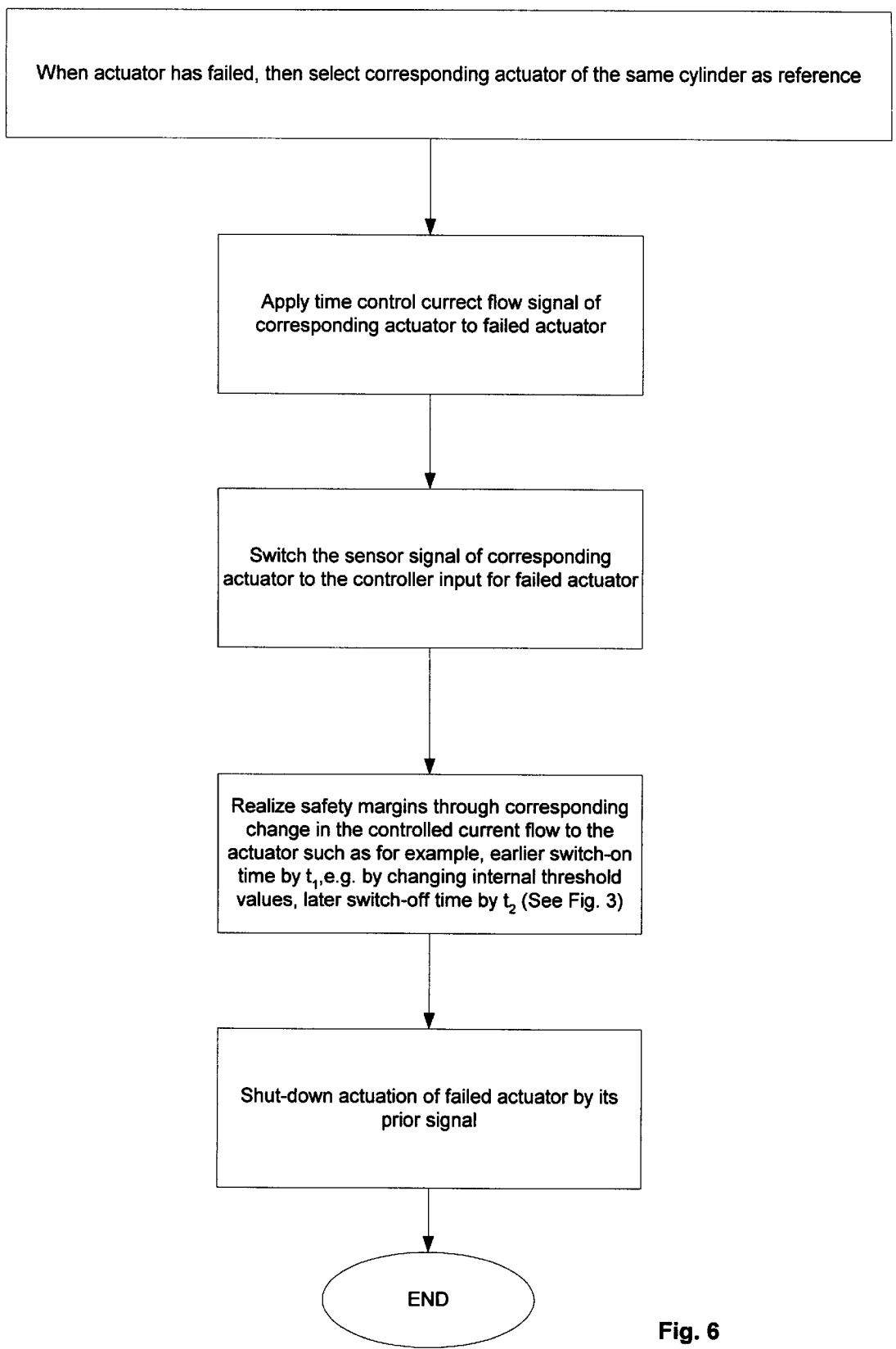
FIG. 6 is a more detailed flow chart for the partial region A in FIG. 5.
Figure 7:
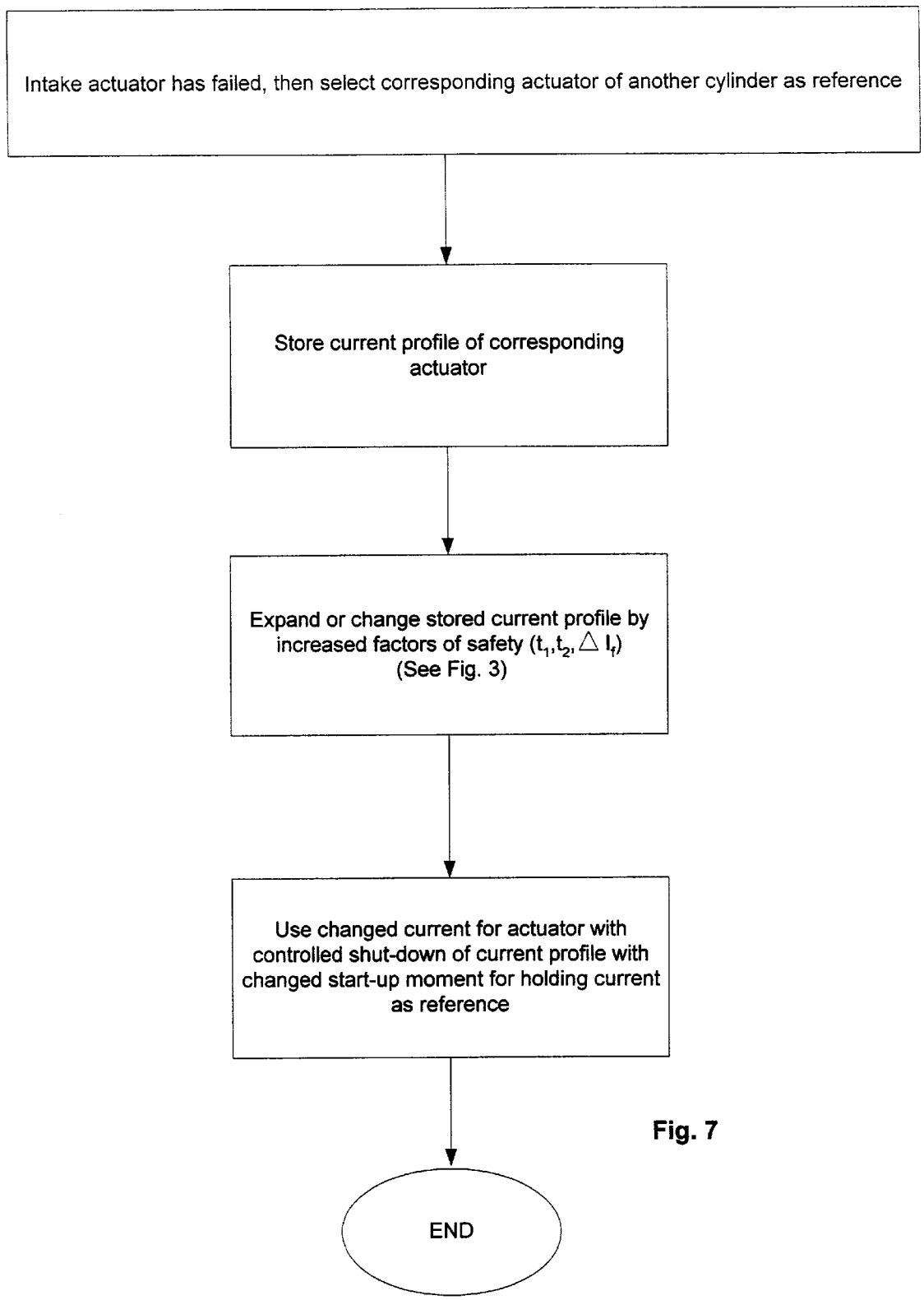
FIG. 7 is a flow chart for a different method sequence in the partial region A than in FIG. 5.

FIG. 5 shows a basic flow chart of the control sequence in the engine control unit for the above-described method. FIGS. 6, 7 and 8 show additional measures respectively carried out for different switching options for the region A in FIG. 5.

FIG. 6 shows the above-described case of the actuator failure at an intake valve, e. g., $I_{E1}$, and the necessary switching to the corresponding intake valve, e.g., during the start-up routine and subsequent operation $I_{E2}$, on the same cylinder.

FIG. 7 shows this sequence for the case where only one intake valve exists for each cylinder. In that case, a switching of the current flow occurs from the intake valve, e.g., $I_{E1}$, to be started to the corresponding intake valve, e.g., $II_{E2}$, on another cylinder.

In the event that a gas discharge valve, e.g., $I_{A1}$, on a piston-type internal combustion engine according to FIG. 2 malfunctions, FIG. 8 shows the switchover to the sensor of a corresponding actuator on the discharge valve $I_{A2}$ of the same cylinder, that is to say for the opening stroke. This action was explained above with the aid of FIG. 4. For the closing stroke, the process sequence is carried out, which is described with the aid of FIG. 3 in connection with FIG. 6, so that separate and different process sequences are planned with respect to the gas discharge valves because of the special operating conditions for the closing operation and the opening operation.

The invention now being fully described, it will be apparent to one of ordinary skill in the art that many changes and modifications can be made thereto without departing from the spirit or scope of the invention as set forth herein.

What is claimed is:

1. A method for monitoring the operation of a piston-type internal combustion engine with electromagnetic actuators for cylinder valves that are variably actuated by an engine control unit that supplies current based on respective predetermined current flows for the actuators, with said cylinder valves each being associated with a respective for sensor transmitting relevant signals to the engine control unit corresponding to the movement of the respective actuator, said method comprising: detecting, in the engine control unit, the respective voltage course and the current flow for each actuator; if a sensor signal of a respective actuator is missing, which tends to indicate a non-operating actuator, determining whether a sensor failure or an actuator malfunction is present from the voltage course at the respective actuator; if a malfunctioning sensor of an actuator is detected, switching, in the engine control unit, the detection of a sensor operation signal for the respective actuator to that of the sensor at a different, corresponding actuator and initiating a start-up operation for the respective actuator initially detected as non operative; and, if a failure of the respective actuator being started up is still detected, shutting down the associated cylinder.

2. A method according to claim 1, wherein if a signal indicating the non operation of an actuator is detected, switching off at least the fuel supply to the associated cylinder until a signal indicating that the associated actuator is operative is received.

3. A method according to claim 1, wherein the initiation of the starting operation includes storing the actual current flow of the actuator that corresponds to the actuator to be started in the control unit, changing the stored actual current by increased factors of safety with respect to the current flow over time or the current level, and actuating the actuator to be started based on the changed current flow.

4. A method according to claim 1 wherein the engine control unit selects an actuator operation as the corresponding actuator if, according to the control program, the selected actuator normally is operated based on the same operating conditions as the actuator to be started.

5. A method according to claim 3 including tapping the actual current flow to be stored from a corresponding actuator of the same cylinder.

6. A method according to claim 3 including tapping the actual current flow to be stored from a corresponding actuator of a different cylinder.

7. A method according claim 6, wherein, in order to take into account the engine dynamic, the actual current to be stored is determined by selecting the actual current flow of an actuator on a cylinder that is positioned in the firing sequence directly in front of the cylinder with the actuator to be started.

8. A method according to claim 1, wherein, to provide an increased factor of safety for an actuator to be started in order to actuate a discharge valve said method further includes, displacing the opening moment of the discharge valve in the direction of a delayed valve opening.

* * * * *